(12) United States Patent
Highgate et al.

(10) Patent No.: US 7,846,604 B2
(45) Date of Patent: Dec. 7, 2010

(54) MEMBRANE ELECTRODE ASSEMBLY WITH CONTROLLED WATER MANAGEMENT/ION FLOW

(75) Inventors: Donald James Highgate, Dorking (GB); Jonathan Anthony Lloyd, Barnack (GB); Simon Bourne, Europa Link (GB); Rachel Louise Smith, Europa Link (GB)

(73) Assignee: ITM Power (Research) Limited, Saffron Walden (GB)

( * ) Notice: Subject to any disclaimer, the term of this patent is extended or adjusted under 35 U.S.C. 154(b) by 1008 days.

(21) Appl. No.: 11/628,133

(22) PCT Filed: Jun. 16, 2005

(86) PCT No.: PCT/GB2005/002356

§ 371 (c)(1),
(2), (4) Date: Dec. 29, 2006

(87) PCT Pub. No.: WO2005/124893

PCT Pub. Date: Dec. 29, 2005

(65) Prior Publication Data

US 2008/0014487 A1 Jan. 17, 2008

(30) Foreign Application Priority Data

Jun. 16, 2004 (GB) ................... 0413514.1
Jul. 27, 2004 (GB) ................... 0416724.3
Aug. 11, 2004 (GB) ................... 0417911.5

(51) Int. Cl.
*H01M 8/04* (2006.01)
(52) U.S. Cl. .......................................... 429/450
(58) Field of Classification Search .................. 429/450
See application file for complete search history.

(56) References Cited

U.S. PATENT DOCUMENTS

2004/0028992 A1 2/2004 Jaouen

FOREIGN PATENT DOCUMENTS

| DE | 102 05 852 | 8/2003 |
|---|---|---|
| DE | 103 08 132 | 9/2004 |
| EP | 1 063 334 | 12/2000 |
| JP | 63 216988 | 9/1988 |
| JP | 07 335233 | 12/1995 |
| WO | WO 03/023890 | 3/2003 |
| WO | WO 2004049490 A2 * | 6/2004 |

* cited by examiner

*Primary Examiner*—Melvin C Mayes
*Assistant Examiner*—Michael Forrest
(74) *Attorney, Agent, or Firm*—Saliwanchik, Lloyd & Saliwanchik

(57) ABSTRACT

A membrane-electrode assembly includes a grid for controlling ion flow, separate layers of membrane material and/or an ionically inactive material for the transmission of a liquid or gaseous reaction component to end/or form at least one of the electrodes.

10 Claims, 7 Drawing Sheets

MEMBRANE ELECTRODE ASSEMBLY WITH CONTROLLED WATER MANAGEMENT/ION FLOW

CROSS-REFERENCE TO A RELATED APPLICATION

This application is a National Stage Application of International Application Number PCT/GB2005/002356, filed Jun. 16, 2005; which claims priority to Great Britain Application No. 0413514.1, filed Jun. 16, 2004; Great Britain Application No. 0416724.3, filed Jul. 27, 2004; and Great Britain Application No. 0417911.5, filed Aug. 11, 2004.

FIELD OF THE INVENTION

This invention relates to an electrochemical cell and, in particular, to a membrane electrode assembly with controlled water management/ion flow.

BACKGROUND OF THE INVENTION

Many ionic polymer membranes used in electrochemical cells as an electrolyte comprise only one active material. Inactive materials are often used as a scaffold and mechanical structure for the active polymer. Some such membranes are laminated, to provide differing properties at each electrode. In all cases, the properties and materials at each point on each of the two membrane electrode surfaces are the same.

Effective water management within an electrochemical cell is necessary, for good performance. For example, in a fuel cell, performance relies heavily on hydration control within the solid polymer electrolyte (SPE). During fuel cell operation, ions migrate through the SPE. As they do so, they take with them water molecules. This is known as electro-osmotic drag. The net result of this phenomenon, for example in a proton-conducting, cationic exchange (CE) SPE, is that the anode becomes prone to drying and the cathode to flooding. This impacts negatively on fuel cell performance, by reducing ease of ion conduction in the SPE and impeding oxygen access to the cathode. Since water is produced at the cathode as a result of the electrochemical reaction, the problem of cathode flooding is compounded. In a hydroxyl ion-conducting anionic exchange (AE) SPE, the situation is reversed, but the problems remain the same: water is produced at the anode, and used at the cathode, hence the anode is prone to flooding and the cathode is prone to drying.

Attempts to overcome these problems have been made via two principal routes. Firstly, the fuel supply has been humidified to help deliver water to the anode side of the SPE membrane, to reduce drying. This requires considerable balance of plant, which increases device cost and reduces power output, while introducing the risk of anode flooding. Secondly, thinner SPE membranes have been pursued, supposedly to reduce the distance water would have to back-migrate, from cathode to anode. However, electro-osmotic drag still restricts water equilibration via this mechanism, while resulting in mechanically less stable SPE membranes with higher fuel cross-over.

The voltage produced by a fuel cell generally depends on the electrochemical potential of the reactants, and the efficiency of any catalyst used. The current produced by the cell depends on its effective area, the ionic resistance of the membrane and how efficient the transfer of fuel is at the catalyst-membrane interface. The power output is a product of the voltage and current, and is normally controlled by throttling or restricting the rate of flow of fuel to the cell, or by providing the cell with unlimited fuel and controlling (e.g. by dumping to a battery) any energy surplus to requirements. These methods of controlling power output are undesirable, primarily for reasons of inefficiency.

WO03/023980 discloses hydrophilic polymers and their use in membrane electrodes assemblies (MEA's) that can be used in or as fuel cells.

SUMMARY OF THE INVENTION

The present invention provides a means whereby water production and/or the flow of ions across the membrane of a MEA can be controlled.

In a first aspect of the invention, the membrane includes an ionically inactive material for the transmission of a liquid or gaseous reaction component to and/or from at least one of the electrodes. Alternatively, the membrane comprises an anionic exchange material and a cationic exchange material, and these materials are separated by an ionically inactive material. A distribution of hydrophilic but not ionically active material can control the hydraulic conditions in the cell, specifically the redistribution of product water, to maintain the efficient operation of the ionomer and prevent or reduce the flooding of the catalyst electrode structure which is a common problem in solid polymer fuel cells based upon Nafion (or other low water content, low water-permeable membranes).

In a second aspect of the invention, the membrane comprises sheets or layers of intrinsically ionically active material, e.g. one or more anionic exchange materials in the form of one or more thin plane parallel layers and one or more cationic materials also in the form of one or more plane parallel layers, and the layers are in ionic contact and arranged so that the flow of ions from one electrode to the other is across the interfaces between the layers of material. One system (say the CE) is in contact with the anode and the other material (say the AE) is in contact with the anode. In this case, the predominant charge carrier is a proton in the CE and an OH ion in the AE. This arrangement means that the catalyst on each electrode can be chosen independently, one to operate in an acid environment while the other operates in an alkaline environment. In addition, in the case of an oxygen-hydrogen fuel cell, the product water will be produced at the interface between the AE and CE elements of the composite membrane, thus avoiding the problem of flooding of the catalyst-electrode structure.

In another aspect of the invention, the MEA includes an electrically conductive grid or grids. This approach, involving controlling the flow of ions by applying a suitable potential different across part at least of the assembly is quite distinct from the throttling and dumping techniques described above. It is particularly suited to use with inherently hydrophilic materials that do not suffer from the hydration problems associated with other SPE technologies.

The MEA may be in the form of a plurality of such assemblies, as a stack. The MEA or stack may be incorporated in a cell. The cell may be used as or in a fuel cell or other electrochemical cell, e.g. an electrolyser or photovoltaic cell.

The present invention provides a composite membrane that may comprise a plurality of active materials, cationic and anionic, and optionally also a hydrophilic and/or a non-active material that is ionically inactive and non-hydrophilic. These may be formed from suitable precursors by polymerisation in situ, to form a solid polymer composite electrolyte (SPCE), or the precursors may be polymerised separately for inclusion into the final membrane.

Use of a SPCE within an electrochemical cell may provide a route for ion conduction through the ionically active phase(s). In the case of fuel cells, electro-osmotic drag will occur here, as is the case in conventional SPE materials. However, there is no ion transport through the ionically inactive phase(s) of the material. Therefore, in hydrophilic ionically inactive phases, water is free to migrate from high to low concentrations through these relatively high diffusivity pathways, to aid hydraulic equilibration to be maintained during operation. Water migration through this phase will not be impeded by electro-osmotic drag. The use of both AE and CE phases in the same SPE provides an additional route for hydration control, while changing ratios allows a variety of water production/use combinations.

The invention allows effective water management within the SPE of electrochemical cells, via a route that does not require additional balance of plant. For example, hydraulic stability within the SPE helps maintain fuel cell efficiency. Hydraulic stability also reduces dimensional changes within the SPE due to drying and re-hydration, which are believed to contribute towards delamination of the catalyst/SPE interface, another common failure mode observed in fuel cells utilising conventional SPE materials.

Another advantage associated with the invention is that it allows for the direct control of electrochemical activity of a cell. In particular, the invention provides a way in which to directly control the electrical power output of a fuel cell.

DESCRIPTION OF PREFERRED EMBODIMENTS

Figure 1:
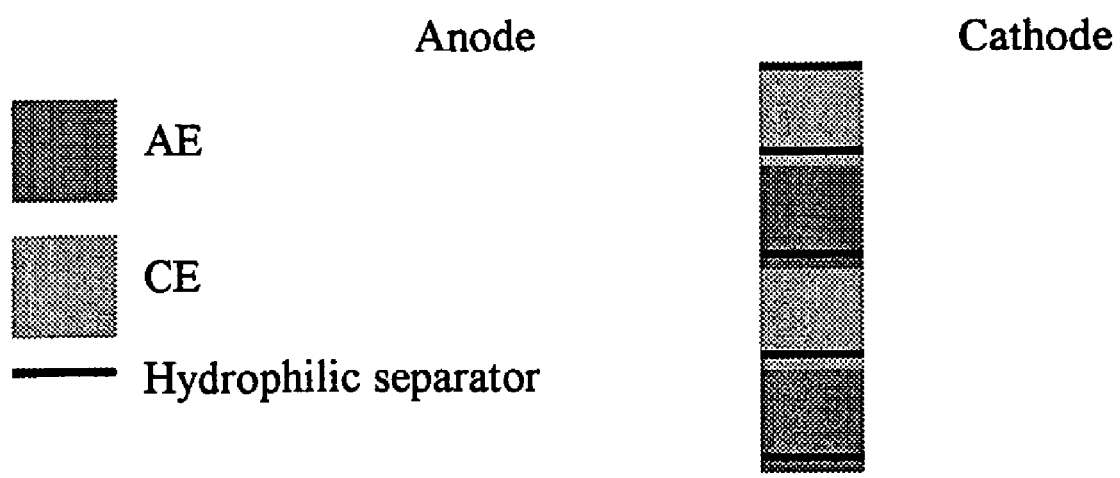
FIGS. 1 and 2 are each schematic representations of an embodiment of the invention.

This invention describes a novel composite material which provides improved hydration maintenance. There are three principal embodiments.

The first principal embodiment incorporates an ionically inactive material which, if hydrophilic, provides a route for water migration within the membrane, which is not impeded by electro-osmotic drag. In the case of CE materials in a fuel cell, this permits back-diffusion of water from the cathode to the anode. Drying of the anode is reduced, as some of the excess water created at the cathode diffuses back through the ionically inactive active component. This helps maintain high efficiency by maintaining high ionic conduction through the SPE. In the case of AE materials in a fuel cell, this permits back-diffusion from the anode to the cathode; the same benefits apply as when applied to CE materials. Additional fuel humidification is not required. Since the ionically inactive material is not electro-chemically active, any such areas on the SPCE surface do not require catalysis. A non-hydrophilic, ionically inactive material can be added to increase physical strength and dimensional stability, if beneficial and/or desired. The membrane may comprise a microporous, non-hydrophilic, ionically active material, for the transmission of water by capillary action.

The second principal embodiment utilises a combination of AE and CE phases in the SPCE, to control the production and use of water at the anode and cathode sites. Since in a fuel cell CE materials generate water at the cathode and AE materials use water at the cathode and produce water at the anode, using different ratios of AE and CE materials allows the control of water production at both the anode and the cathode. An ionically inactive phase should be used to separate the ionic phases; this could be hydrophilic, to enhance water diffusion, or non-hydrophilic, to provide separation and additional strength or dimensional stability.

The third principal embodiment involves the use of a grid. This can be used to control ion flow.

These three embodiments can be used separately or together, to provide a multifaceted approach to hydration control and ion flow through the membrane.

A product of the invention may be produced by a process which comprises two stages, i.e. production of the ionically inactive phase(s), and impregnation with ionically active hydrophilic polymer(s).

The Ionically Inactive Active Phase

The ionically inactive material may be hydrophilic or non-hydrophilic or a combination, depending on the application.

The ionically inactive phase should be produced to dimensions sufficient to allow effective water transport and to provide a reasonable area of ionically active material. These dimensions may vary, depending on the application of the final product.

An example of the ionically inactive phase is a mesh having a thickness of between 10 and 2000 µm, and pore sizes of between 100 and 100,000 µm. The pores may be of any geometry.

A further example is an ionically inactive powder, comprising particles of a diameter between 10 and 2000 µm, interspersed between the ionically active materials, prior to polymerisation.

Most polymers will absorb some water even if described as hydrophobic; for instance, most polymers including those which might be considered to be hydrophobic will absorb up to 5% water. A polymer must be selected to match the water transport requirements in an electrochemical cell.

Specific examples of materials that are ionically inactive and non-hydrophilic are polyester or polyethylene.

Examples of monomers having hydrophilic properties are amino-alkyl acrylates and methacrylates, especially those in which the alkyl group has 1 to 4 carbon atoms, e.g. methyl or ethyl. The amino group may be mono- or di-substituted and any substituent is preferably a $C_{1-4}$ alkyl group, e.g. methyl or ethyl. Specific examples are aminoethyl acrylate, dimethylaminoethyl acrylate, methylaminoethyl methacrylate and diethylaminoethyl methacrylate. Hydroalkyl acrylates and methacrylates may also be used as the hydrophilic monomer and in these the alkyl group is preferably of 1 to 4 carbon atoms, e.g. methyl or ethyl. A specific example is hydroxyethyl methacrylate (HEMA).

Preferred hydrophilic monomers include N-vinylpyrrolidone (VP) and other vinyl lactams, and acrylamide and methacrylamide and N-substituted derivatives thereof. Substituted acrylamide and methacrylamide derivatives may be mono- or di-substituted, and preferred substituents are alkyl, hydroxylalkyl and aminoalkyl (including mono- and di-substituted aminoalkyl), e.g. di-alkyl aminoalkyl groups. Preferably any alkyl group present contains 1 to 4 carbon atoms, methyl and ethyl being especially preferred. Examples of such derivatives are N-methylacrylamide, N-isopropylacrylamide, N,N-dimethylacrylamide, N,N-dimethylaminomethylacryamide, N, N-dimethylaminoethylacrylamide and N-methylaminoisopropylacrylamide.

The polymers are preferably copolymers of two or more hydrophilic monomers, e.g. as described above, or of one or more hydrophilic monomers with one or more other monomers. Preferably, a hydrophilic monomer is copolymerised with an alkyl acrylate or methacrylate, especially one in which the alkyl group has from 1 to 4 carbon atoms, e.g. methyl or ethyl, or acrylonitrile. Styrene may also be used as a comonomer. Specific examples of suitable copolymers are copolymers of VP and methyl methacrylate (MMA), of VP and HEMA, and of VP, styrene and acrylonitrile. Co-polymers of terephthalic acid and VP may also be suitable.

It is preferred that the polymers should be cross-linked, and this may be achieved by incorporating di- or poly-functional cross-linking agents in the monomer system. Examples of suitable cross-linking agents are compounds containing two or more ethylenically unsaturated groups, e.g. allyl methacrylate, divinylbenzene, ethylene glycol dimethacrylate, trimethylolpropane trimethacrylate and trimethylolpropane trimethacrylate. Usually it is desirable that the polymers should be relatively lightly cross-linked, the cross-linking agent being used, for example, in an amount of about 1% by weight of the monomer system.

High-strength polymer systems are also preferred in some cases, such as that obtained from acrylonitrile and VP.

A composite material containing, say, methacrylic acid can be produced incorporating its own integral pH control material. As such, the material is a composite, containing both acid and alkali components as part of the same structure. Such a material can be used as an ionically active component within a SPCE or as a novel composite SPE in its own right. Methacrylic acid may be polymerised via a number of routes including gamma irradiation and thermal initiation, e.g. with one or more of acrylonitrile, MMA, HEMA, N,N,N-trimethylammonium chloride, vinylbenzene trimethylammonium chloride, water and allyl methacrylate. An example of such a material is obtained from methacrylic acid, acrylonitrile, vinylbenzene trimethylammonium chloride, water and allyl methacrylate.

Polymerisation of the Ionically Inactive Active Phase

Polymerisation of the hydrophilic ionically inactive phases may be affected by use of a chemical initiator and by heating or by use of radiation, in which case neither heating nor an initiator is necessary. Electro-polymerisation is also possible.

A particularly satisfactory chemical initiator is azobispropylpercarbonate or an organic peroxide such as benzoyl peroxide. Heating at temperatures in the range of 30 to 80° C., preferably 35 to 70° C., is generally suitable and it is often desirable to conduct the heating in a series of stages at increasing temperatures.

After the basic polymerisation has been conducted, a post-cure treatment may be effected, e.g. by heating the polymer at a temperature of 85 to 95° C., preferably under vacuum.

If the polymerisation is to be effected by irradiation, various forms of radiation may be used, e.g. ionising radiation such as UV light, X-rays or gamma rays, or particulate radiation such as electron or photon beams. Preferably the radiation is ionising gamma radiation from a cobalt 60 source or a beam of electrons. After the basic polymerisation has been completed, a post-cure treatment may be effected by further irradiation.

Polymerisation irradiation between 0.1 and 20 Mr can be used, though most hydrophilic polymers are preferably polymerised at doses of between 1 and 4 Mr. This preferred dose should be applied over periods of between 1 hour and 10 days.

Commonly, the mixture subject to the polymerisation will consist of the monomer or monomers, cross-linking agent and any initiator needed but, if desired, a solvent for one or more of the monomers may be included, e.g. water.

Once the ionically inactive active phase is prepared, ionically conductive material can be used to fill the gaps provided by the ionically inactive phase. This may then be polymerised in situ. Alternatively, the phases can be polymerised separately and then combined to make a membrane.

Polymers for Use in the Ionically Active Phase

There are two main categories of ionically active materials, AE SPE and CE SPE. Such materials are described in WO03/023890, the content of which is incorporated by reference. According to this invention, these materials are used either separately with an ionically inactive phase or in combination. In all cases, the AE and CE phases may contain a number of different polymer mixtures, with different ionic groups and different ionic strengths.

A specific example is the use of AE and CE phases separated by an ionically inactive hydrophilic phase, used with a hydrogen and oxygen fuel cell. This is shown in FIG. 1. In the example of a 1:1 ratio of CE and AE, the following reactions would occur. At the anode, $4 H_2$ in, $4 H_2O$ out; at the cathode, $2 O_2$ in.

The CE phase uses hydrogen from the anode, oxygen from the cathode and produces water at the cathode. Water is also dragged across the membrane towards the cathode as a result of osmotic drag.

The AE phase uses hydrogen from the anode, oxygen and water from the cathode and produces water at the anode. Any osmotic drag also carries water from the cathode to the anode. The hydrophilic pathways allow water to diffuse across the membrane.

A further example uses a 3:1 ratio of CE:AE ionic phases, separated by a non-hydrophilic ionically inactive phase. In a hydrogen:oxygen fuel cell this would result in the same amounts of water being produced at the anode and at the cathode. With the correct ratio of AE:CE depending on electro-osmotic drag levels, a system may be produced which obviates any need for any gas hydration, and gives a self-hydrating SPE.

Polymerisation of the ionically active material for this second stage, follows the same principles as those required for the hydrophilic phase.

The use of AE-CE laminates, whether or not physically separated allows the catalyst on each electrode to be chosen separately for optimum chemical response and may result in a higher open circuit potential from the cell than would be available when using a single membrane. In addition, when using hydrogen and oxygen as fuel and oxidant the product water is produced within the membrane structure at the interface between the AE and CE layers. These layers will be forced apart by the hydrostatic pressure of the product water and thus a preferred embodiment of this invention involves the use of interpenetrated network structures to form the join between the various layers and maintain internal integrity (hydraulic and electrical) of the composite structure.

The junction between the laminates should be strong enough to prevent separation due to water build-up and consequent hydraulic forces. This may be achieved by the use of a suitable adhesive, but a preferred system is the interpenetrated network polymer system described in GB-A-1463301, the content of which is incorporated herein by reference.

Use of a Control Grid

In a preferred embodiment, a cell of the invention comprises an electrically conductive grid disposed within the membrane of the cell. A voltage can be applied across an electrode and the grid, allowing the flow of ions across the membrane to be controlled. In effect, the grid can be viewed to act as an electrostatic screen. The use of such a grid is desirable since it allows the power output of the cell to be accurately controlled, thereby improving the cell's efficiency.

The grid may be made of a metal (e.g. gold) or carbon fibre, and may comprise a catalyst. It may be coated with a material which is electrically and/or ionically resistant, allowing it to be maintained at a different potential to that of the membrane, without donating electrons to or removing electrons from the system. Such a grid is particularly preferred when the membrane conducts only a single ionic species, for example a proton exchange membrane such as Nafion®.

A particularly preferred embodiment of the invention is a laminate of layers of AE and CE materials between which ions flow to the layers. Thus, proton-conducting and OH-conducting layers can provide a laminate in which water may be produced where the layers interface, rather than at the surface of the membrane. In this way, flooding of any catalyst present can be avoided. The two facing layers are essentially in ionic contact, e.g. through the open spaces of a grid as described above. This arrangement provides a controllable fuel cell. It may also allow different catalyst materials to be used at the cathode and the anode.

Figure 2:
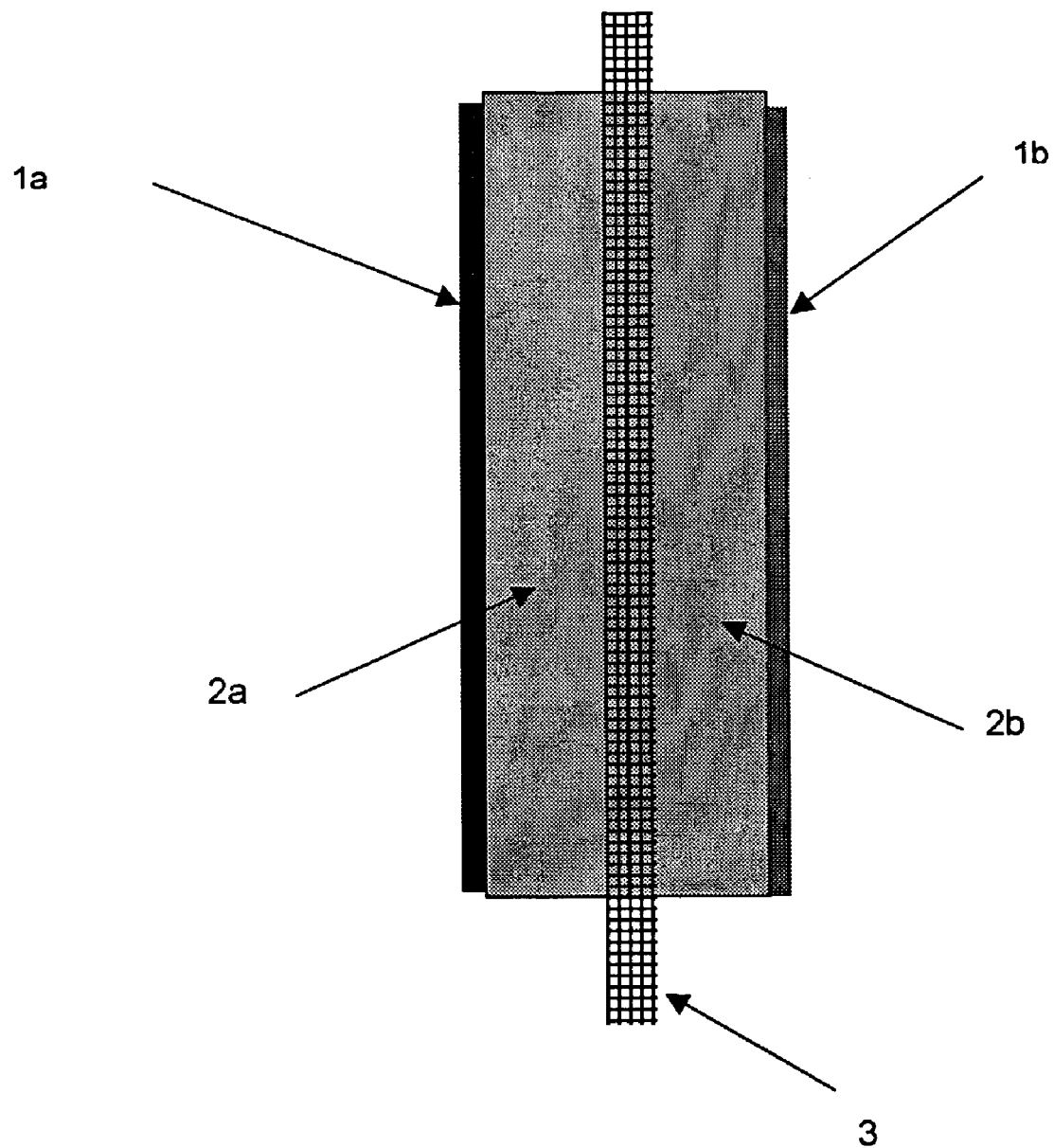

An embodiment of the invention will now be described by way of example only, with reference to FIG. 2 of the accompanying drawings. This drawing shows an electrochemical cell comprising electrodes 1*a* and 1*b*, separated by a membrane. The membrane is a laminate of layers of an anionic exchange material 2*a* and a cationic exchange material 2*b*, the layers in ionic contact through the open spaces of a grid 3. The rate of ion flow across the membrane can be controlled by applying a potential difference across an electrode and the grid. This arrangement provides a controllable electrochemical cell.

The use of a control grid has been shown to have a significant effect even when embedded in a membrane of uniform properties, i.e. in an AE-AE structure.

More than one grid may be used, e.g. a pair of grids in which the potential is applied between the grids or between the grids and either of the electrodes forming the MEA.

A time-varying applied potential (an a/c potential) may be applied, so that the output of the cell or the consequent change in cell properties is also time-varying (in effect producing an a/c output from the fuel cell; normally an inherently d/c device).

The following Examples illustrate the invention.

Example 1 shows the effect of a single insulated control grid when used in a fuel cell consisting of an AE-CE combination. In this case the output of the cell can be varied widely as shown in the figures.

Example 2 shows the effect of an un-insulated gold grid in a membrane of AE-AE construction. In this case the effective conductivity of the membrane can be controllably varied by some 30%.

Example 1

Test Cell

The test cell comprised both CE and AE polymers separated, but not isolated, by a metallic mesh (gold or platinum) coated to render it both electrically and ionically isolated from both polymers. The CE polymer was adjacent to the oxidant supply and the AE was adjacent to the fuel supply. Catalyst was platinum black coated on carbon cloth.

Electrical Circuit

Figure 3:
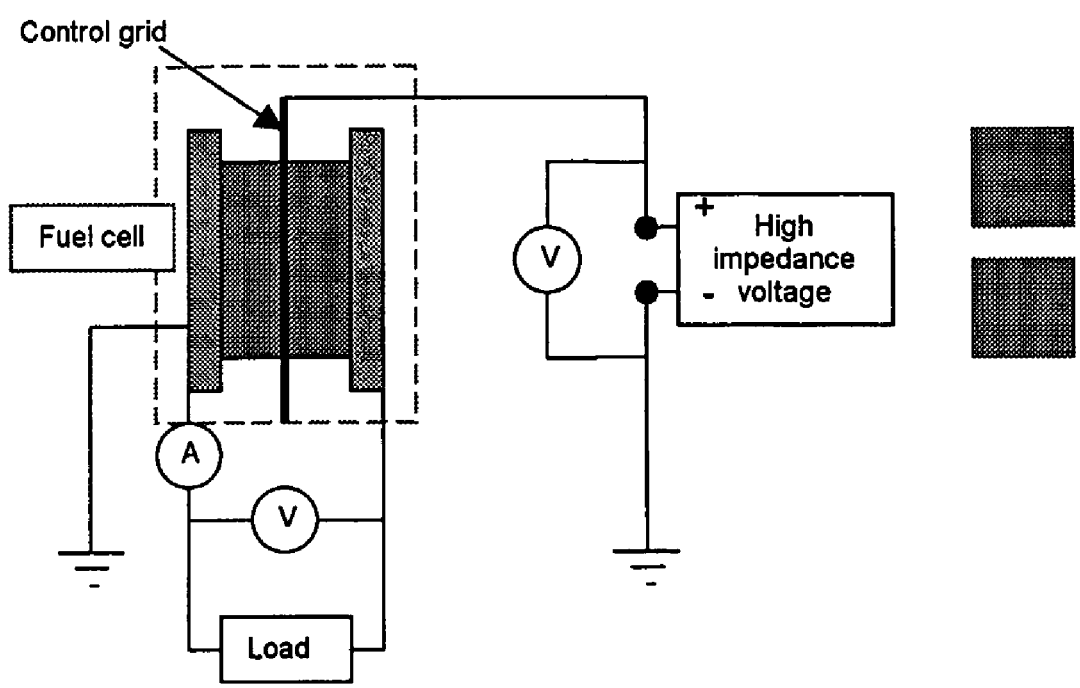
FIGS. 3 and 5 are each schematic representations of circuits embodying the invention.

A high impedance, controllable voltage supply was connected to the control grid. The electrical circuit is shown in FIG. 3.

Test Regimes

A) The voltage between the fuel cell anode and cathode was held constant at 0.3V using a Prodigit electronic load. During this time the current delivered from the fuel cell was recorded over a 5 minute period. This procedure was repeated while applying different voltages to the control grid.

B) The circuit between the fuel cell anode and cathode was opened, preventing the flow of any current between the two. The cell voltage was recorded at 1 and 2 minutes post open circuit.

C) The fuel cell was polarised using a resistance decade box. The cell current and voltage were logged and the power output calculated.

Figure 4A:
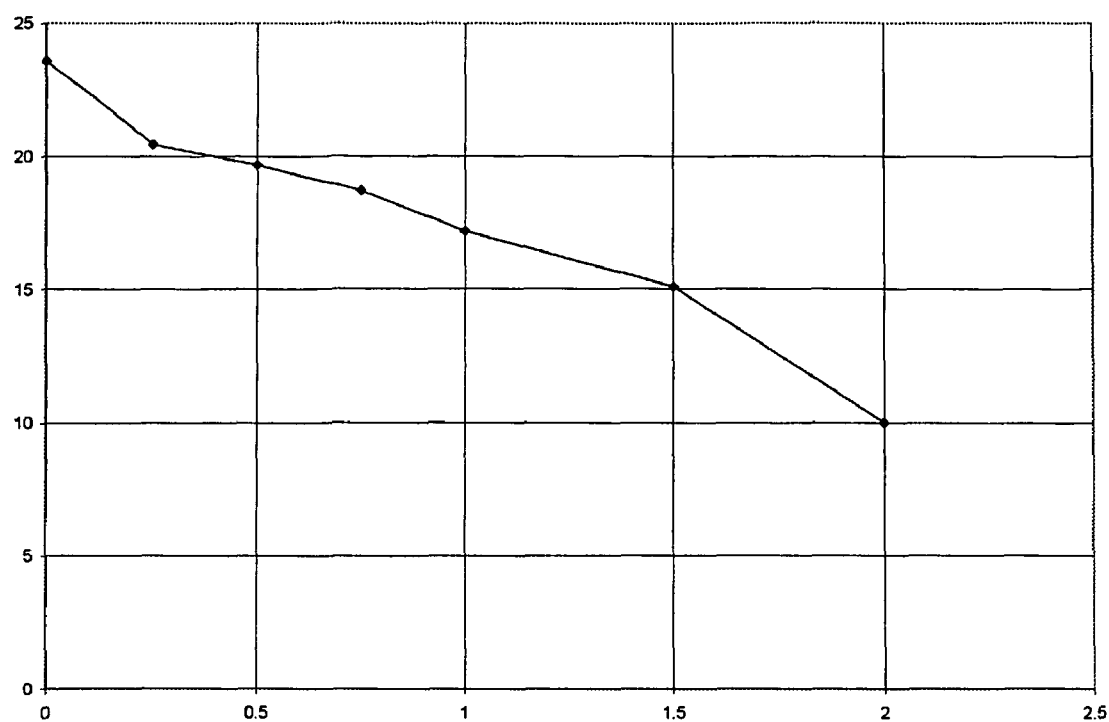
FIGS. 4A to 4C are graphical representations of results obtained in operation of the invention.
Figure 4B:
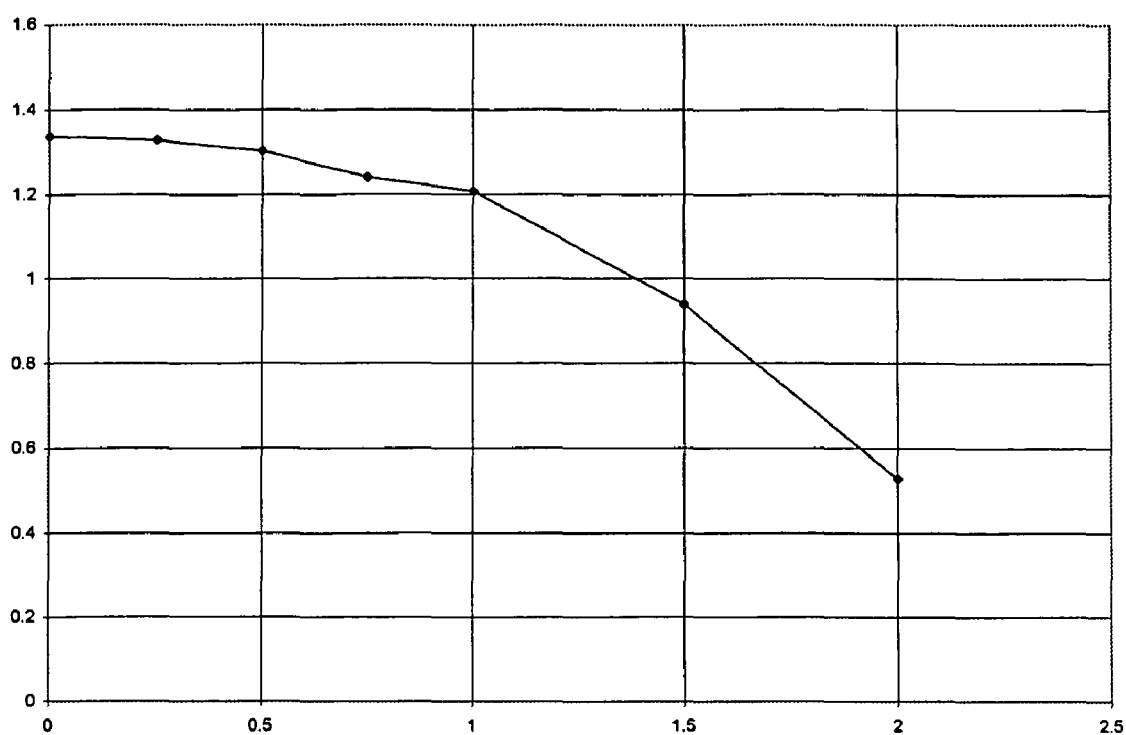
Figure 4C:
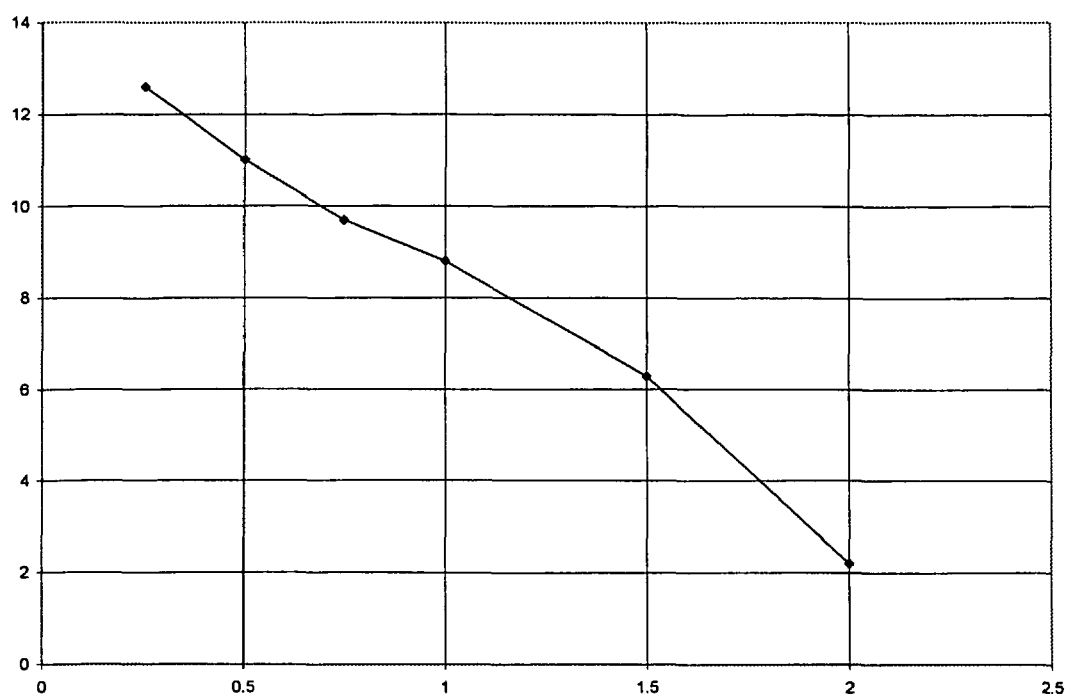

The results from Test Regimes A to C are shown in FIGS. 4A to 4C, respectively. Each is a graph plotting cell current (mA) against potential difference between oxidant electrode and control grid (V).

Example 2

Figure 5:
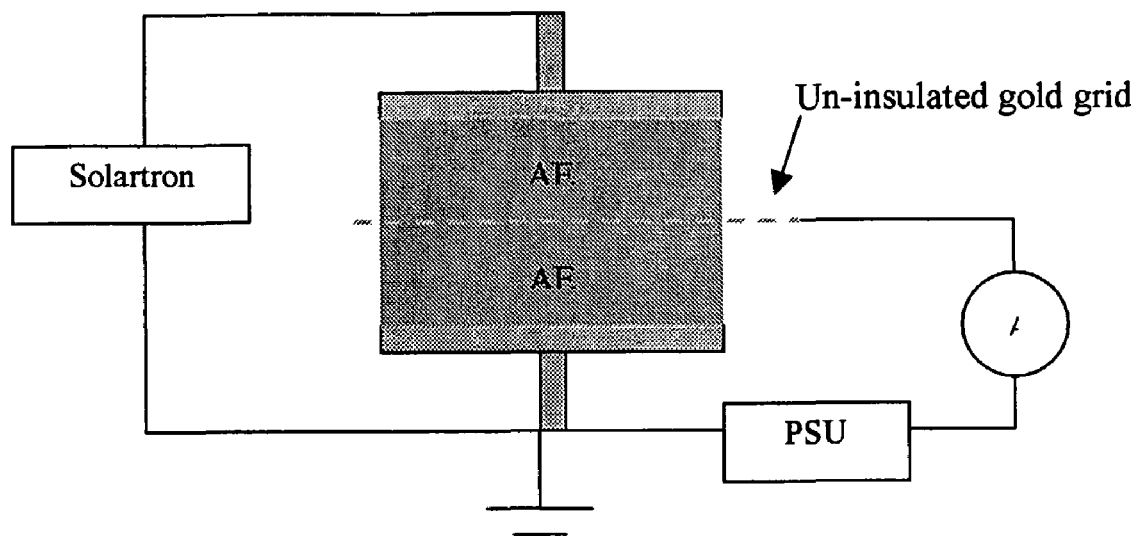

A gold grid was compressed between 2 AE materials. The assembly and electrical circuit are shown in FIG. 5. A Solartron Complex Impendence test apparatus provided a 1V DC bias with 10 mV modulation. The current through the grid was monitored to ensure it was always zero.

Initially, the PSU (power supply unit) was turned on, but the grid disconnected, and the Solartron applied a frequency scan to the membrane to establish the frequency at which the conductivity was completely real. This was 130 kHz.

Then the membranes were scanned at constant frequency of 130 kHz for 5 mins, sampling every 5 seconds. After ~1 min, the conductivity stabilised to 3.40 $mScm^{-1}$.

The grid was then connected to the PSU and 1 V was applied across it. The constant frequency scan was repeated. The conductivity increased to 4.66 $mScm^{-1}$.

The grid was disconnected and the conductivity decreased to 3.36 $mScm^{-1}$. The grid was re-connected and the conductivity increased to 4.77 $mScm^{-1}$.

The invention claimed is:

1. A membrane-electrode assembly which comprises electrodes separated by an ion-exchange membrane, and which also comprises a means of controlling the flow of ions across the membrane, wherein the membrane includes, as said means, an electrically conductive grid.

2. The assembly according to claim 1, wherein the grid is coated with an electrically and/or ionically resistant material.

3. The assembly according to claim 1, in association with a means for providing a potential difference across part at least of the assembly.

4. The assembly according to claim 1, wherein the membrane is a cationic exchange (CE) membrane.

5. The assembly according to claim 1, wherein the membrane is an anionic exchange (AE) membrane.

6. The assembly according to claim 1, wherein the membrane comprises an AE material and a CE material.

7. The assembly according to claim 1, wherein the membrane is hydrophilic.

8. The assembly according to claim 1, wherein the membrane is at least 0.5 mm thick.

9. A stack of membrane-electrode assemblies which comprises a plurality of assemblies, wherein each membrane-electrode assembly comprises:

electrodes separated by an ion-exchange membrane, and which also comprises a means of controlling the flow of ions across the membrane, wherein the membrane includes, as said means, an electrically conductive grid.

10. A fuel cell or electrolyser that comprises at least one membrane-electrode assembly
which comprises electrodes separated by an ion-exchange membrane, and which also comprises a means of controlling the flow of ions across the membrane, wherein the membrane includes, as said means, an electrically conductive grid.

* * * * *